US008408351B2

(12) United States Patent
Holland et al.

(10) Patent No.: US 8,408,351 B2
(45) Date of Patent: Apr. 2, 2013

(54) SYSTEM AND METHOD FOR ENHANCING VEHICLE HANDLING AND TRACTION

(75) Inventors: Steven W. Holland, St. Clair, MI (US); Nikolai K. Moshchuk, Grosse Poine, MI (US)

(73) Assignee: GM Global Technology Operations LLC, Detroit, MI (US)

(*) Notice: Subject to any disclaimer, the term of this patent is extended or adjusted under 35 U.S.C. 154(b) by 212 days.

(21) Appl. No.: 12/968,345

(22) Filed: Dec. 15, 2010

(65) Prior Publication Data

US 2012/0152639 A1 Jun. 21, 2012

(51) Int. Cl.
*B60K 28/16* (2006.01)
(52) U.S. Cl. .......................... 180/282; 280/755
(58) Field of Classification Search .................. 180/282; 280/755, 5.504–5.507
See application file for complete search history.

(56) References Cited

U.S. PATENT DOCUMENTS

| | | | | |
|---|---|---|---|---|
| 4,201,058 | A * | 5/1980 | Vaughan | 60/618 |
| 4,463,551 | A * | 8/1984 | Morris | 60/39.35 |
| 5,301,111 | A * | 4/1994 | Utsui et al. | 701/37 |
| 5,890,084 | A * | 3/1999 | Halasz et al. | 701/45 |
| 6,036,199 | A * | 3/2000 | Oshida et al. | 280/5.504 |
| 6,053,509 | A * | 4/2000 | Izawa et al. | 280/5.504 |
| 6,208,920 | B1 * | 3/2001 | Izawa et al. | 701/36 |
| 6,394,738 | B1 * | 5/2002 | Springer | 414/673 |
| 6,428,024 | B1 * | 8/2002 | Heyring et al. | 280/124.106 |
| 6,725,135 | B2 * | 4/2004 | McKeown et al. | 701/32.4 |
| 6,820,411 | B2 | 11/2004 | Pederson et al. | |
| 6,879,898 | B2 * | 4/2005 | Ghoneim et al. | 701/48 |
| 6,892,525 | B2 * | 5/2005 | Guiheen et al. | 60/200.1 |
| 6,938,924 | B2 * | 9/2005 | Feldman et al. | 280/755 |
| 6,949,152 | B2 * | 9/2005 | Hallit et al. | 149/1 |
| 7,467,684 | B2 * | 12/2008 | Wang et al. | 180/282 |
| 7,494,153 | B2 * | 2/2009 | Wang | 280/755 |
| 7,584,601 | B2 * | 9/2009 | Metcalfe et al. | 60/202 |
| 8,095,269 | B2 * | 1/2012 | Pruett et al. | 701/39 |
| 8,112,982 | B2 * | 2/2012 | Metcalfe et al. | 60/204 |
| 2002/0100836 | A1 * | 8/2002 | Hunt | 244/50 |
| 2005/0131604 | A1 * | 6/2005 | Lu | 701/38 |
| 2008/0269976 | A1 * | 10/2008 | Birgersson | 701/29 |
| 2009/0001764 | A1 * | 1/2009 | Hoppenstein et al. | 296/203.01 |
| 2010/0168938 | A1 * | 7/2010 | Seo et al. | 701/13 |
| 2012/0029770 | A1 * | 2/2012 | Hirao et al. | 701/38 |
| 2012/0078470 | A1 * | 3/2012 | Hirao et al. | 701/38 |

* cited by examiner

*Primary Examiner* — Nicole Verley
(74) *Attorney, Agent, or Firm* — Quinn Law Group, PLLC

(57) ABSTRACT

A vehicle includes a suspension system operatively connecting a vehicle body to a plurality of wheels for maintaining contact between the wheels and a road surface, and for maintaining handling of the vehicle. A system for steering the vehicle and a braking system for decelerating the vehicle are also included. The vehicle additionally includes a plurality of thrusters, wherein at least one of the thrusters is arranged relative to each wheel and each of the plurality of thrusters is configured to generate a force. Furthermore, the vehicle additionally includes a controller configured for regulating the force generated by each of the thrusters to assist the suspension system with maintaining contact between the wheels and the road surface and maintaining handling, assist the steering system with steering, and assist the braking system with decelerating the vehicle. A method of assisting the vehicle suspension, steering, and braking systems is also disclosed.

18 Claims, 2 Drawing Sheets

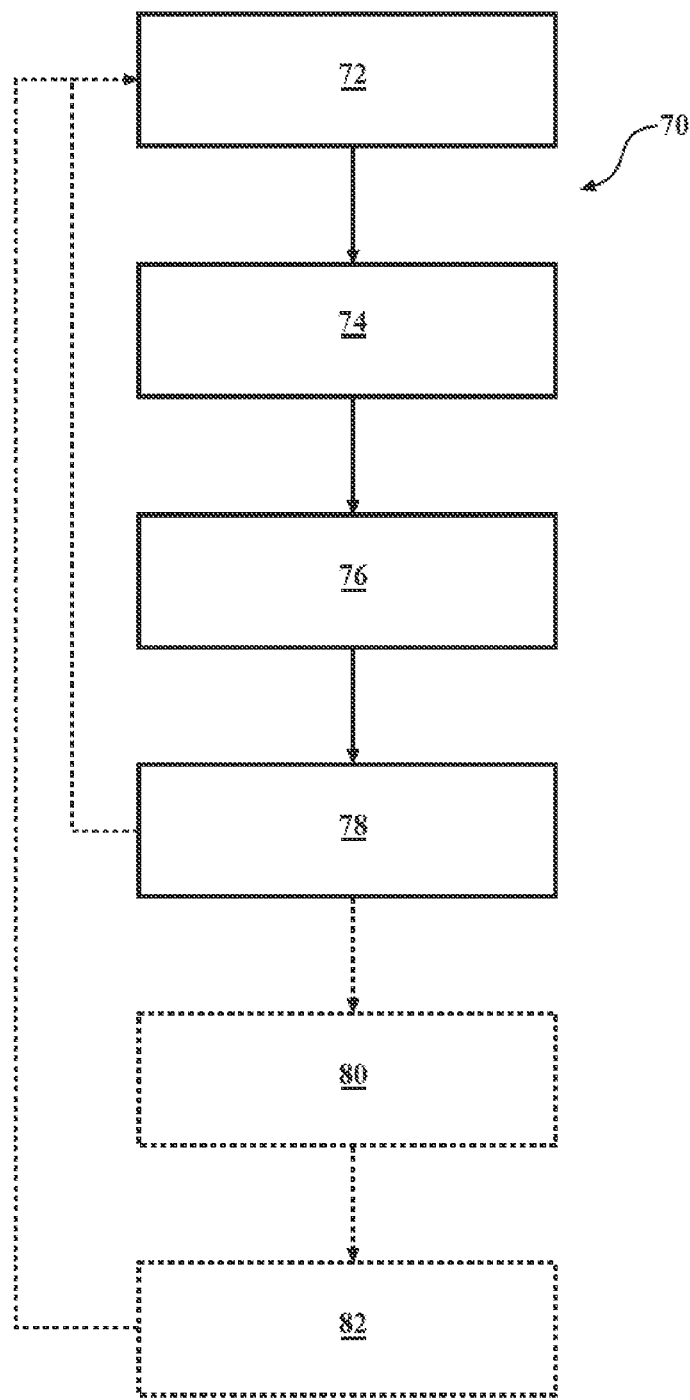

SYSTEM AND METHOD FOR ENHANCING VEHICLE HANDLING AND TRACTION

TECHNICAL FIELD

The invention relates to a system and a method for enhancing vehicle handling and traction.

BACKGROUND

In vehicles, steering, suspension, and braking systems are typically provided to aid in controlling the vehicle in response to road conditions and operator input.

The steering system is typically a collection of components and linkages that are configured to permit a vehicle operator to either keep the vehicle on a desired course or change the vehicle's direction. The braking system is employed to apply a retarding force, typically via frictional elements at the vehicle's wheels, to inhibit vehicle motion. The suspension is typically a system of springs, shock absorbers, and linkages that connects a vehicle body to its wheels. Suspension systems serve to contribute to the vehicle's road holding or handling and braking for effective active safety and driving pleasure, and to keep vehicle occupants comfortable and reasonably isolated from road noise, irregularities, and vibrations.

Accordingly, the vehicle suspension, steering, and braking systems typically work in concert to generate effective active safety for the subject vehicle. Although such systems facilitate control of vehicle responses, all control input generated by the vehicle operator is transmitted to the road surface through the wheels, and is therefore limited by the contact area between the wheels and the road.

SUMMARY

A motor vehicle includes a vehicle body and a plurality of wheels. The vehicle also includes a vehicle suspension system operatively connecting the body to the plurality of wheels for maintaining contact between the wheels and a road surface, and for maintaining handling of the vehicle. The vehicle additionally includes a vehicle steering system operatively connected to at least one of the plurality of wheels for steering the vehicle and a vehicle braking system operatively connected to at least one of the plurality of wheels for decelerating the vehicle. Furthermore, the vehicle includes a plurality of thrusters mounted on the vehicle, wherein at least one of the plurality of thrusters is arranged relative to each wheel and each of the plurality of thrusters is configured to generate a force. The vehicle additionally includes a controller configured for regulating the force generated by each of the plurality of thrusters to assist the suspension system with maintaining contact between the wheels and the road surface and maintaining handling, assist the steering system with steering, and assist the braking system with decelerating the vehicle.

The vehicle may also include at least one sensor arranged on the vehicle. In such a case, the at least one sensor may be configured to sense a g-force acting on the vehicle and communicate the sensed g-force to the controller for regulating the force generated by each of the plurality of thrusters.

The sensed g-force may be indicative of at least one of a braking, acceleration, and cornering maneuver of the vehicle.

The vehicle may also include a gas compressor mounted relative to the plurality of thrusters. In such a case each of the plurality of thrusters may be configured to generate a jet of compressed gas, and the gas compressor may be configured to recharge the plurality of thrusters with compressed gas. The controller may be programmed to regulate the gas compressor to recharge the plurality of thrusters.

Each of the plurality of thrusters may be adjustable to generate the force in a direction that is between and inclusive of perpendicular and parallel to the road surface. Accordingly, the controller may be programmed to regulate the direction of the force generated by each of the plurality of thrusters.

The plurality of thrusters may be charged with reactants that constitute a propellant that is configured to generate the force via a chemical reaction of the reactants. The chemical reaction may be accompanied by combustion of the reactants in order to generate the force.

According to the method, the controller may be programmed to compare a desired motion of the vehicle body and the actual motion of the body for regulating the force generated by each of the plurality of thrusters.

Also disclosed is a method of assisting a vehicle suspension system with maintaining contact between vehicle wheels and a road surface and maintaining vehicle handling, assisting a vehicle steering system with steering the vehicle, and assisting the vehicle braking system with decelerating the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a flow chart illustrating a method of assisting the vehicle's suspension, steering, and braking systems in controlling the vehicle's dynamic response.

DETAILED DESCRIPTION

Figure 1:
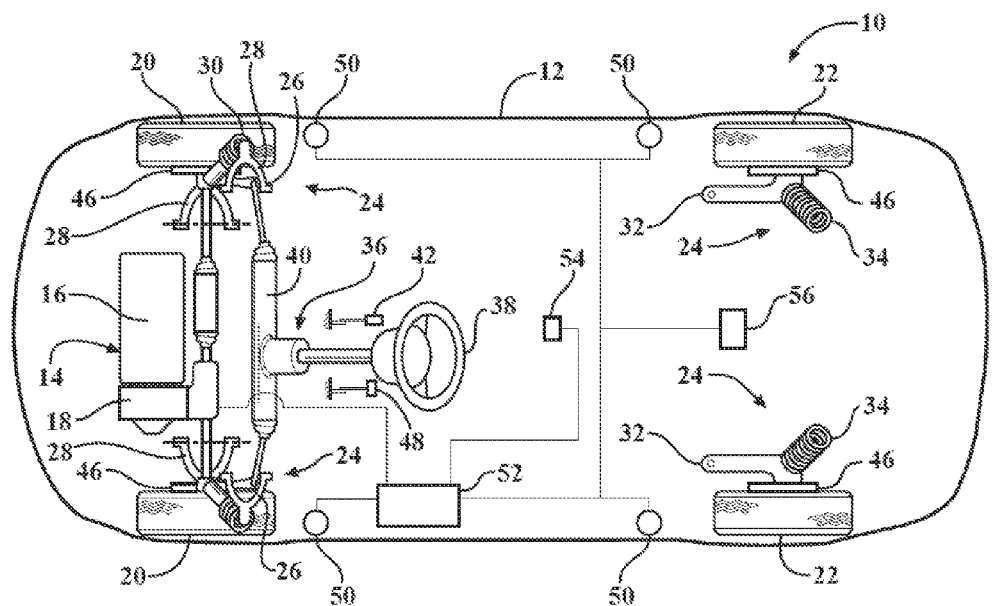
FIG. 1 is a schematic illustration of a motor vehicle equipped with a system for assisting the vehicle's suspension, steering, and braking systems in controlling the vehicle's dynamic response.

Referring to the drawings, wherein like reference numbers refer to like components, FIG. 1 shows a schematic view of a motor vehicle 10 which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators as well as a fuel cell, neither of which are shown, but a powertrain configuration employing such devices is appreciated by those skilled in the art.

The vehicle 10 also includes a plurality of wheels that include front wheels 20 and rear wheels 22. Although four wheels, a pair of front wheels 20 and a pair of rear wheels 22 are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface, and for maintaining handling of the vehicle. The suspension system 24 may include an upper control arm 26, a lower control arm 28 and a strut 30 connected to each of the front wheels 20. The suspension system 24 may also include a trailing arm 32 and a spring 34 connected to each of the rear wheels 22. Although a specific configuration of the suspension system 24 is shown in FIG. 1, other vehicle suspension designs are similarly envisioned.

As shown in FIG. 1, a vehicle steering system 36 is operatively connected to the front wheels 20 for steering the vehicle 10. The steering system 36 includes a steering wheel 38 that is operatively connected to the wheels 20 via a steering rack 40. The steering wheel 38 is arranged inside the passenger compartment of the vehicle 10, such that an operator of the vehicle may command the vehicle to assume a particular direction with respect to the road surface. Additionally, an accelerator pedal 42 is positioned inside the passenger compartment of the vehicle 10, wherein the accelerator pedal is operatively connected to the powertrain 14 for commanding propulsion of the vehicle 10.

As shown in FIG. 1, a vehicle braking system is operatively connected to the wheels 20, 22 for decelerating the vehicle 10. The braking system includes a friction braking mechanism 46 at each of the wheels 20, 22. Although not shown in detail, it will be appreciated that each braking mechanism 46 may include a rotor, brake pads, and calipers. The calipers may be configured to hold the brake pads relative to the rotors, and to apply a force to the brake pads in order to squeeze the rotors for decelerating the vehicle 10. The force applied by the braking system is controlled via a brake pedal 48. The brake pedal 48 is positioned inside the passenger compartment of the vehicle 10, and is adapted to be controlled by the operator of the vehicle 10.

The vehicle 10 also includes thrusters 50 mounted on the vehicle 10. The thrusters 50 are provided for enhancing handling and traction of the vehicle 10 during cornering, acceleration, and/or braking maneuvers. Each of the thrusters 50 includes a nozzle which is not shown in detail, but the existence of which is appreciated by those skilled in the art. As shown in FIG. 1, each of the thrusters 50 is arranged proximate to one of the wheels 20, 22. Each of the thrusters 50 is configured to generate a force that acts to modify the attitude of the vehicle 10. The vehicle 10 also includes a controller 52 adapted for regulating the force generated by each of the thrusters 50 to assist the suspension system 24 with maintaining contact between the wheels 20, 22 and the road surface and maintaining handling of the vehicle 10. The controller 52 is also adapted for regulating the force generated by each of the thrusters 50 to assist the steering system 36 with steering the vehicle 10, and for assisting the braking system with decelerating the vehicle. The controller 52 may be additionally programmed to regulate the operation of the powertrain 14.

A sensor 54, such as an accelerometer, is arranged on the vehicle 10. The sensor 54 may be positioned on the body 12. The sensor 54 may be mounted near the center of gravity of the vehicle 10 for measuring acceleration forces in the vertical, lateral, and fore-aft directions. The sensor 54 is configured to sense the g-forces acting on the vehicle 10 and communicate the sensed g-force to the controller 52 for regulating the force generated by each of the thrusters 50. The controller 52 may be programmed to compare a desired motion of the vehicle body and the actual motion of the body for regulating the force generated by each of the plurality of thrusters 50. Although a single sensor 54 is shown in FIG. 1, nothing prevents at least one sensor placed proximate to each wheel 20, 22 in order to sense dynamic response of the vehicle 10 during various operator initiated maneuvers and other occurrences.

Generally, the g-forces sensed by the sensor 54 may act on the vehicle 10 as a result of, and, therefore, be indicative of cornering, forward acceleration, and/or braking of the vehicle and the forces generated during such maneuvers. Furthermore, the vehicle 10 may employ a stability control system (not shown) that uses a yaw sensor for the system's operation. Accordingly, the controller 52 may be additionally programmed to employ the yaw rate of the body 12 as sensed by the yaw sensor for regulating the force generated by each of the thrusters 50.

A gas compressor 56 is mounted on the vehicle 10 relative to the thrusters 50. The compressor 56 is configured to recharge the thrusters 50 with compressed gas, such as air or nitrogen, either continuously, based on a detection of the amount of compressed gas contained in each thruster 50, or at some preset interval. The controller 52 is operatively connected to the gas compressor 56, and is programmed to regulate the gas compressor to recharge the plurality of thrusters. Thus, the gas supplied by the compressor 56 permits the thrusters 50 to generate a jet of compressed gas in a direction away from the vehicle 10 that is between and inclusive of perpendicular and parallel to the road surface.

The forces generated by the thrusters 50 act on the body 12 for countering the g-forces described above. The controller 52 is programmed to regulate the direction of the force generated by each of the thrusters 50 by adjusting the thrusters with respect to the body 12. Such adjustment of the appropriate thruster(s) 50 operates to direct a jet of gas to counter the g-forces sensed by the sensor 54 that other systems, of the vehicle 10 are either incapable or insufficient to counter by other means. For example, the thruster 50 may be used to counter lateral g-forces, but would typically not be used to decelerate the vehicle 10 when acceleration is requested by the operator of the vehicle, because the braking system is generally designed to perform such a function. The thrusters 50 being adjusted to generate a jet of compressed gas in a direction substantially perpendicular to the road surface may be seen in FIG. 1, while the thrusters being adjusted to generate a jet of compressed gas in a direction substantially parallel to the road surface may be seen in FIG. 2.

The thrusters 50 may also be charged with reactants that are configured to generate the force via a chemical reaction in order to counter the g-forces sensed by sensor 54. Such a chemical reaction may be accompanied by combusting the reactants inside the thruster(s) 50 in order to generate a higher magnitude of force from the gas jet. In such a case, the controller 52 may be programmed to initiate combustion of the reactants inside the thrusters 50. Overall, any manner of generating a gas jet from the thrusters 50 is deemed appropriate for providing a force for countering the sensed g-forces acting on the vehicle 10.

Figure 2:
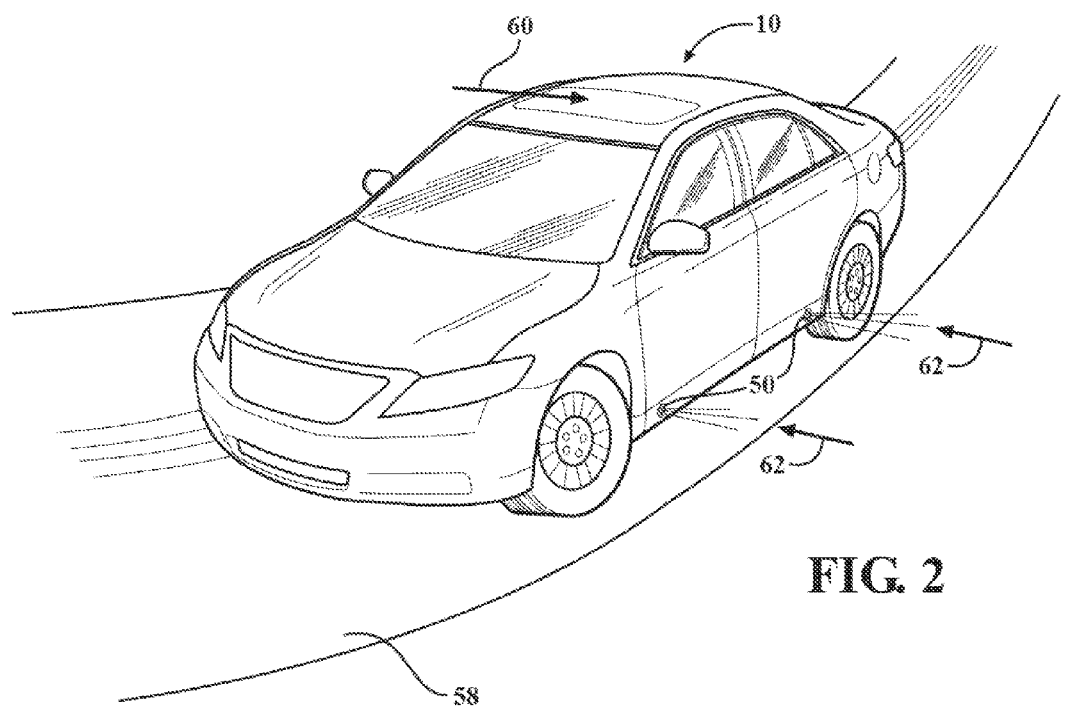
FIG. 2 is a schematic illustration of the vehicle equipped with the system shown in FIG. 1 during operation.

FIG. 2 depicts a vehicle 10 being operated relative to a road surface 58. As shown, the vehicle is subjected to a lateral g-force 60 acting on the body of the vehicle 10 during a cornering maneuver. As shown, two thrusters 50 are activated along one side of the body 12 during the cornering maneuver to assist the vehicle 10 with following a desired path along the road surface 58. Each thruster 50 is regulated by the controller 52 to generate a gas jet largely parallel to the road surface 58 in a direction opposite to that of the g-force 60, to thereby apply a force 62 to counteract the g-force and maintain the vehicle 10 on the desired path. The intensity of the gas jet generated by each thruster 50 and the force 62 applied thereby may either be same or different between the two thrusters. Similarly, the direction of the gas jet generated by each thruster 50 with respect to the body 12 and to the road surface may either be same or different.

During the cornering maneuver depicted in FIG. 2, the thrusters 50 on the opposite side of the vehicle 10 may simultaneously be used to mitigate roll of the vehicle 10. To perform such a function, the thrusters 50 on the opposite side of the vehicle 10 may be adjusted to direct the gas jet largely perpendicular to and away from the road surface 58. Such use of the thrusters 50 on the opposite side of the vehicle will apply the force 62 to generate additional load to push down the side of the body 12 that has a tendency to lift.

The thrusters 50 may also be used during a braking maneuver (not shown). During braking maneuvers the vehicle 10 may undergo a dynamic weight transfer such that the g-force 60 acts on the front wheels 20. In such a case, the thrusters 50 may be regulated to generate a gas jet perpendicular to the road surface in a direction opposite to that of the g-force 60, such that the force 62 is applied to the wheels 22, thus improving traction and assisting braking. Similarly, during a forward acceleration maneuver (not shown), the vehicle 10 may undergo a dynamic weight transfer such that the g-force 60 acts on the rear wheels 22. Accordingly, if desired, such as in the case of a four-wheel-drive or all-wheel-drive vehicle, the thrusters 50 may be regulated to generate a gas jet perpendicular to the road surface 58 such that the force 62 is applied to the wheels 20, thus improving traction and assisting acceleration.

Additionally, all the thrusters 50 may be used to direct their respective gas jets upward, or largely perpendicular to and away from the road surface 58 (not shown). Directing gas jets from all the thrusters 50 upward will enhance general handling and traction of the vehicle 10 by simultaneously increasing the force applied to all four wheels 20, 22. Such use of thrusters 50 may be especially beneficial for reducing aerodynamic lift or temporary aerodynamic instability of the body 12 which may unload the wheels 20, 22 and cause deterioration in the control of the vehicle 10 when the vehicle is traveling at a high rate of speed. Although a number of exemplary situations and uses are described above, in general, however, the thrusters 50 may be used in any various combinations and directions to assist keeping the vehicle 10 on a desired path by applying additional load to the appropriate wheels 20, 22.

FIG. 3 depicts a method 70 of assisting vehicle suspension system 24 with maintaining contact between vehicle wheels 20, 22 and a road surface and maintaining handling of the vehicle 10, assisting a vehicle steering system 36 with steering the vehicle, and assisting the vehicle braking system with decelerating the vehicle as described with respect to FIGS. 1 and 2. The method commences in frame 72 with the vehicle 10 being operated relative to a road surface, and proceeds to frame 74, where the method includes sensing and determining or estimating the g-force 60 acting on the vehicle 10 via sensor 54 during a cornering, acceleration, and/or braking maneuver. From frame 74 the method proceeds to frame 76, where the method includes communicating the sensed g-force 60 to the controller 52. According to the method, the controller 52 is programmed to compare the desired motion or response of the body 12 and the actual response of the body. Following frame 76, the method moves to frame 78, where the method includes regulating a magnitude of the force 62 generated by each of the thrusters 50 via the controller 52 in response to the sensed g-force 60. After frame 78, the method may loop back to frame 72 in order to respond to a subsequent cornering, acceleration, and/or braking maneuver of the vehicle 10.

After frame 78, the method may additionally proceed to frame 80, where the method includes adjusting the direction of the force 62 generated by each of the thrusters 50 in response to the sensed g-force 60. Following frame 78, the method may advance to frame 82 where it includes recharging the thrusters 50 with compressed gas via the gas compressor 56. After the thrusters 50 are recharged in frame 82, the method may loop back to frame 72 and recommence in order to respond to a subsequent cornering, acceleration, and/or braking maneuver of the vehicle 10.

While the best modes for carrying out the invention have been described in detail, those familiar with the art to which this invention relates will recognize various alternative designs and embodiments for practicing the invention within the scope of the appended claims.

The invention claimed is:

1. A motor vehicle comprising:
    a vehicle body;
    a plurality of wheels;
    a vehicle suspension system operatively connecting the body to the plurality of wheels for maintaining contact between the wheels and a road surface, and for maintaining handling of the vehicle;
    a vehicle steering system operatively connected to at least one of the plurality of wheels for steering the vehicle;
    a vehicle braking system operatively connected to at least one of the plurality of wheels for decelerating the vehicle;
    a plurality of thrusters mounted on the vehicle, wherein each of the plurality of thrusters is arranged proximate to each respective wheel and each of the plurality of thrusters is configured to generate a force that is substantially parallel to the road surface; and
    a controller configured for regulating the force generated by each of the plurality of thrusters to assist the suspension system with maintaining contact between the wheels and the road surface and maintaining handling, and assist the steering system with steering the vehicle.

2. The vehicle of claim 1, further comprising at least one sensor arranged on the vehicle, wherein the at least one sensor is configured to sense a g-force acting on the vehicle and communicate the sensed g-force to the controller for regulating the force generated by each of the plurality of thrusters.

3. The vehicle of claim 2, wherein the sensed g-force is indicative of at least one of a braking, acceleration, and cornering maneuver of the vehicle.

4. The vehicle of claim 1, further comprising a gas compressor mounted relative to the plurality of thrusters, wherein each of the plurality of thrusters is configured to generate a jet of compressed gas, and the gas compressor is configured to recharge the plurality of thrusters with compressed gas.

5. The vehicle of claim 4, wherein the controller is programmed to regulate the gas compressor to recharge the plurality of thrusters.

6. The vehicle of claim 1, wherein each of the plurality of thrusters is adjustable to generate the force in a direction that is between and inclusive of perpendicular and parallel to the road surface.

7. The vehicle of claim 6, wherein the controller is programmed to regulate the direction of the force generated by each of the plurality of thrusters.

8. The vehicle of claim 1, wherein the plurality of thrusters is charged with reactants that are configured to generate the force via a chemical reaction.

9. The vehicle of claim 8, wherein the chemical reaction is accompanied by combustion of the reactants.

10. The vehicle of claim 1, wherein the controller is programmed to compare a desired motion of the vehicle body and the actual motion of the body for regulating the force generated by each of the plurality of thrusters.

11. A method of assisting a vehicle suspension system with maintaining contact between vehicle wheels and a road surface and maintaining vehicle handling, and assisting a vehicle steering system with steering the vehicle, the method comprising:

sensing a g-force acting on the vehicle via at least one sensor operatively connected to the vehicle;

communicating the sensed g-force to a controller;

regulating a magnitude of a force generated by each of a plurality of thrusters that is substantially parallel to the road surface via a controller in response to the sensed g-force, wherein each of the plurality of thrusters is arranged proximate to each respective wheel, such that the force assists the suspension system with maintaining contact between the wheels and a road surface and maintaining handling, and assists the steering system with steering the vehicle.

12. The method of claim 11, wherein the sensed g-force is indicative of at least one of a braking force, an acceleration force, and a cornering force acting on the vehicle.

13. The method of claim 11, wherein the controller is programmed to generate a jet of compressed gas via at least one of the plurality of thrusters, the method further comprising generating a jet of compressed gas via at least one of the plurality of thrusters.

14. The method of claim 11, wherein the controller is programmed to regulate a gas compressor mounted on the vehicle to recharge the plurality of thrusters, the method further comprising recharging the plurality of thrusters with compressed gas via the gas compressor.

15. The method of claim 11, wherein the controller is programmed to regulate a direction of the force generated by the plurality of thrusters between and inclusive of perpendicular and parallel to the road surface, the method further comprising adjusting the direction of the force generated by each of the plurality of thrusters in response to the sensed g-force.

16. The method of claim 11, wherein the controller is programmed to regulate charging the plurality of thrusters with reactants, the method further comprising charging the plurality of thrusters with reactants and generating the force via a chemical reaction of the reactants.

17. The method of claim 16, further comprising initiating a combustion of the reactants using the controller.

18. The method of claim 11, further comprising comparing a desired motion of the vehicle body and the actual motion of the body by the controller for regulating the force generated by each of the plurality of thrusters.

* * * * *